May 6, 1958
F. A. JENKINS
2,833,927
METHOD OF SEPARATING ISOTOPES OF URANIUM IN A CALUTRON
Filed Nov. 17, 1944
2 Sheets-Sheet 1
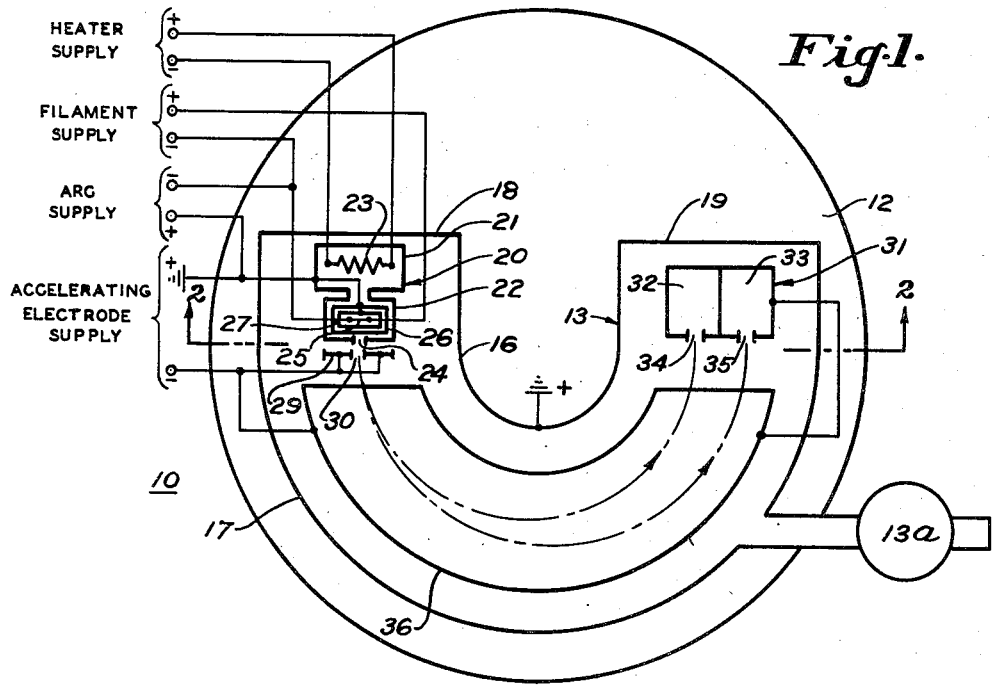
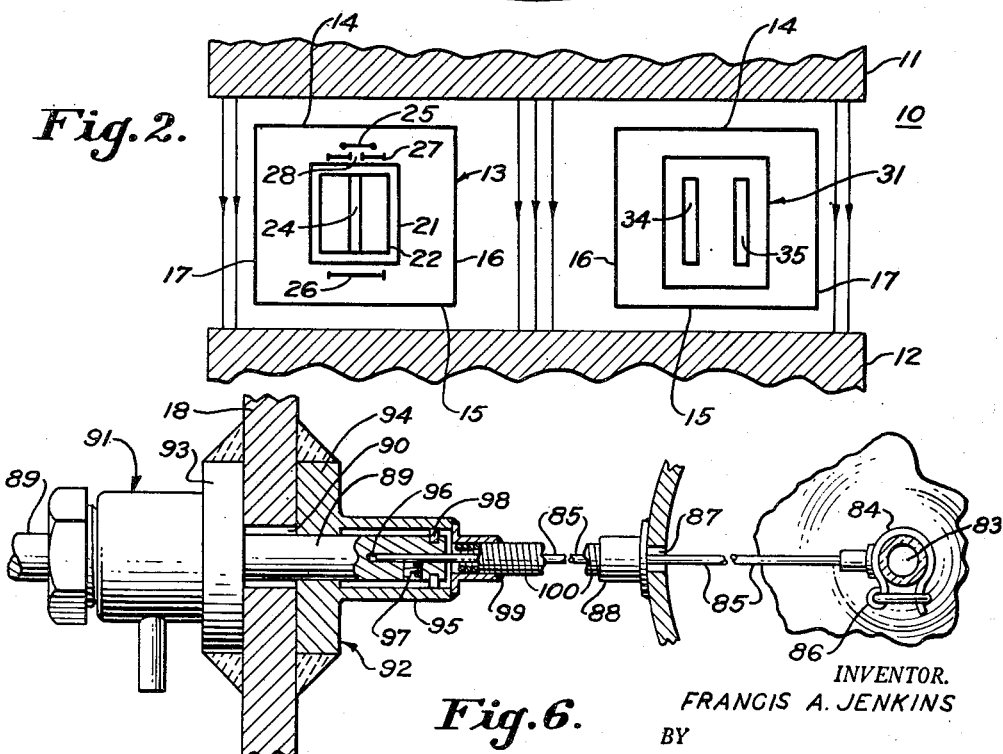
INVENTOR.
FRANCIS A. JENKINS
BY
Robert A. Lavender
ATTORNEY.

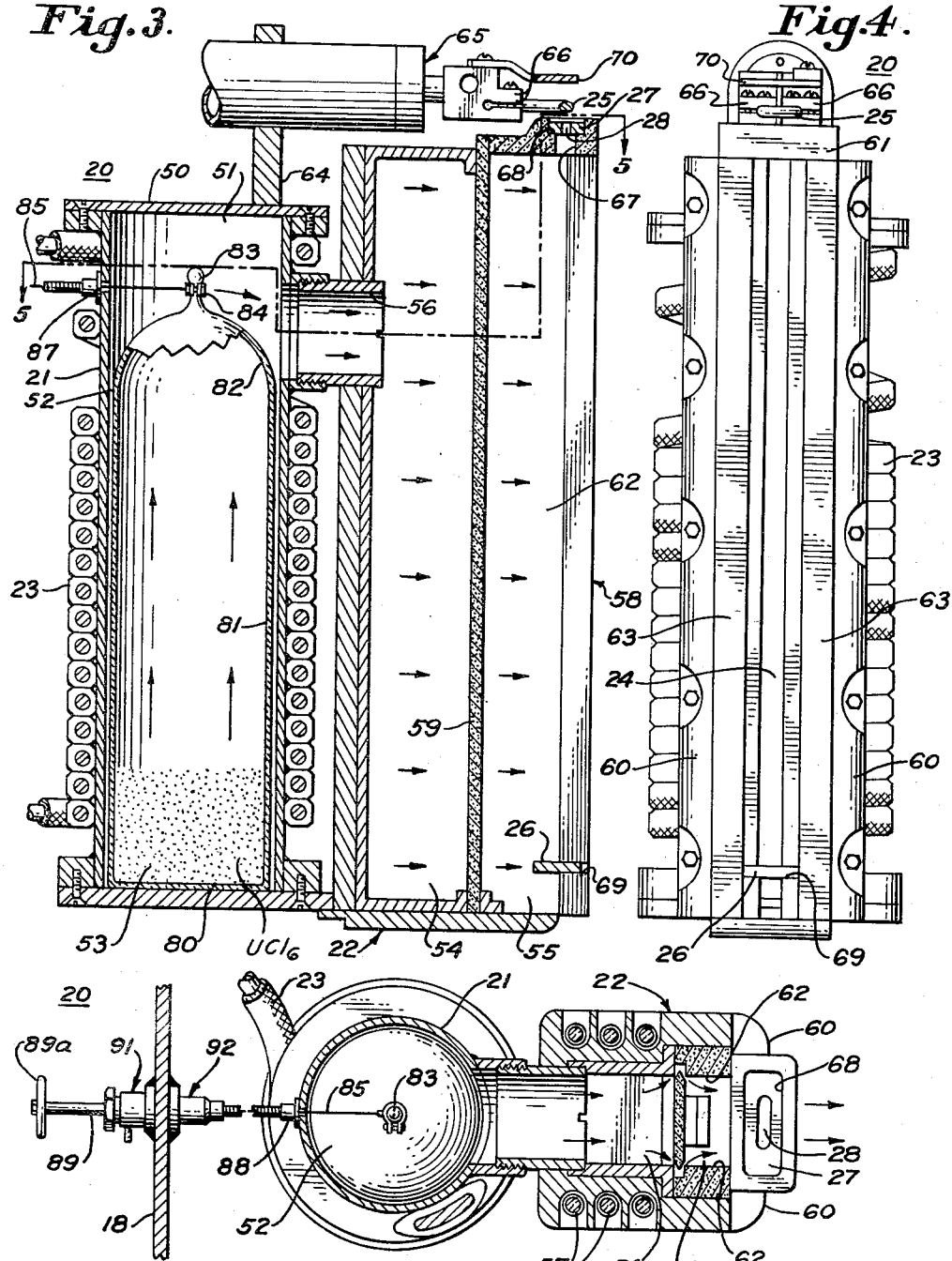

United States Patent Office 2,833,927
Patented May 6, 1958

2,833,927

METHOD OF SEPARATING ISOTOPES OF URANIUM IN A CALUTRON

Francis A. Jenkins, Berkeley, Calif., assignor to the United States of America as represented by the United States Atomic Energy Commission Application November 17, 1944, Serial No. 563,952

5 Claims. (Cl. 250—41.9)

The present invention relates to methods for the ionization of uranium hexachloride vapor. More particularly, the invention relates to methods for ionizing uranium hexachloride vapor as a part of the procedure for separating in a calutron, or other similar device, uranium isotopes present in the vapor of the uranium hexachloride. In another aspect of the invention, it pertains to calutron systems for the separation of uranium isotopes in which uranium hexachloride is employed as charge material.

At the outset, it is noted that a "calutron" is a machine of the character of that disclosed in the copending application of Ernest O. Lawrence, Serial No. 557,784, filed October 9, 1944, now Patent No. 2,909,222, granted May 24, 1955, and is employed to separate the constituent isotopes of an element and, more particularly, to increase the proportion of a selected isotope in an element containing a plurality of isotopes in order to produce the element enriched with the selected isotopes. For example, the machine may be advantageously employed in the separation of uranium isotopes.

Such a calutron essentially comprises means for vaporizing a quantity of material containing an element that is to be enriched with a selected one of its several isotopes; means for subjecting the vapor to ionization, whereby at least a portion of the vapor is ionized causing ions of the several isotopes of the element to be produced; electrical means for segregating the ions from the un-ionized vapor and for accelerating the segregated ions to relatively high velocities; electromagnetic means for deflecting the ions along curved paths, the radii of curvature of the paths of the ions being proportional to the square roots of the masses of the ions, whereby the ions are concentrated in accordance with their masses; and means for de-ionizing and collecting the ions of the selected isotopes thus concentrated, thereby to produce a deposit of the element enriched with the selected isotope.

More particularly, a calutron of the type noted ordinarily comprises an evacuated tank housing a removable ion source unit, formed principally of steel and including structure providing a charge reservoir and a communicating charge ionizing chamber. In the operation of such a calutron, ordinary the charge reservoir of the ion source unit is packed with uranium tetrachloride, the ion source unit is placed in the tank, and then the tank is sealed and evacuated. Thereafter, the charge is heated and vaporized and the vapor fills the charge reservoir and enters the communicating charge ionizing chamber, where it is ionized.

While the operation of a calutron in the manner described is generally satisfactory, the operating conditions are not entirely ideal in certain respects. More particularly, the charge ordinarily employed, i. e., uranium tetrachloride, while it possesses a fair degree of volatility, is nevertheless not as volatile as could be desired for the purposes hereinabove indicated, in that its vapor pressure at a temperature of 400° C. is of the order of 0.0048 mm. Hg and at 500° C. its vapor pressure is of the order of 0.70 mm. Hg. Accordingly, it will be apparent that in order to supply vapor of this material to the ionization chamber of a calutron at practicable flow rates, it is necessary to employ temperatures of a relatively high order of magnitude.

Accordingly, it is an object of the present invention to provide an improved calutron source material having more favorable volatility characteristics than any heretofore known.

Another object of the invention is to provide an improved method for the separation of uranium isotopes, involving the utilization of a uranium-containing starting material of relatively high volatility.

It is a further object of the invention to ionize the vapor of uranium hexachloride.

Another object of the invention is to provide an improved method for operating a calutron in which uranium hexachloride is employed as the charge material.

A still further object of the invention is to provide a calutron method for the separation of uranium isotopes, involving the use of a uranium compound as starting material having a relatively high degree of volatility at a relatively low temperature.

I have discovered that uranium hexachloride constitutes an excellent starting material for use in processes involving the step of ionizing vapor of the material mentioned, and particularly when this step is employed in conjunction with the calutron method for the separation of uranium isotopes. Uranium hexachloride possesses a sufficiently high degree of volatility, as compared to the volatilities of inorganic salts in general, and as compared to the volatility of uranium tetrachloride heretofore employed for the purpose in particular, that it can be satisfactorily volatilized at relatively low temperatures of the order of 60° to 100° C. and thereby produce vapor of uranium hexachloride at a practicable rate for ionization purposes, particularly under the conditions of high vacua preferably employed in processes of this character.

The invention, both as to its organization and method of operation, together with further objects and advantages thereof, will best be understood by reference to the following specification, taken in connection with the accompanying drawings in which Figure 1 is a diagrammatic plan view of a calutron including an ion source unit embodying the present invention and in conjunction with which the method of the present invention may be carried out; Fig. 2 is a diagrammatic sectional view of a calutron taken along the line 2—2 in Fig. 1; Fig. 3 is a longitudinal sectional view of the calutron ion source unit; Fig. 4 is a front elevational view of the source unit shown in Fig. 3; Fig. 5 is a sectional view of the ion source unit and the associated end wall of the tank of the calutron, taken principally along the line 5—5 in Fig. 3, illustrating the mechanism for opening the charge receptacle contained in the charge reservoir of the source unit housed in the tank of the calutron; and Fig. 6 is an enlarged fragmentary view, partly in section, of the charge receptacle opening mechanism shown in Fig. 5.

Referring now more particularly to Figs. 1 and 2 of the drawings, there is illustrated a representative example of a calutron 10 of the character noted, that comprises magnetic field structure including upper and lower pole pieces 11 and 12, provided with substantially flat parallel spaced-apart pole faces, and a tank 13 disposed between the pole pieces 11 and 12. The pole pieces 11 and 12 carry windings, not shown, which are adapted to be energized in order to produce a substantially homogeneous and relatively strong magnetic field therebetween, which magnetic field passes through the tank 13 and the various parts housed therein. The tank 13 is of tubular configuration, being substantially crescent-shaped in plan, and comprising substantially flat parallel spaced-apart top and bottom walls 14 and 15, upstanding curved inner and outer side walls 16 and 17, and end walls 18 and 19. The end walls 18 and 19 close the opposite ends of the tubular tank 13 and are adapted to be removably secured in place, whereby the tank 13 is hermetically sealed. Also, vacuum pumping apparatus 13a is associated with the tank 13, whereby the interior of the tank 13 may be evacuated to a pressure of the order of $10^{-5}$ to $10^{-4}$ mm. Hg. Preferably, the component parts of the tank 13 are formed of steel, the top and bottom walls 14 and 15 thereof being spaced a short distance from the pole faces of the upper and lower pole pieces 11 and 12 respectively, the tank 13 being retained in such position in any suitable manner, whereby the top and bottom walls 14 and 15 constitute in effect pole pieces with respect to the interior of the tank 13, as explained more fully hereinafter.

The removable end wall 18 suitably supports a source unit 20 comprising a charge receptacle 21 and a communicating arc-block 22. An electric heater 23 is arranged in heat exchange relation with the charge receptacle 21 and is adapted to be connected to a suitable source of heater supply, whereby the charge receptacle 21 may be appropriately heated, the charge receptacle 21 being formed of steel or the like. The arc-block 22 is formed, at least partially, of carbon or graphite and is substantially C-shaped in plan, an upstanding slot 24 being formed in the wall thereof remote from the charge receptacle 21. Thus, the arc-block 22 is of hollow construction, the cavity therein communicating with the interior of the charge receptacle 21.

Also, the removable end wall 18 carries a filamentary cathode 25 adapted to be connected to a suitable source of filament supply, the filamentary cathode 25 overhanging the upper end of the arc-block 22 and arranged in alignment with respect to the upper end of the cavity formed therein. The arc-block 22 carries an anode 26 disposed adjacent the lower end thereof and arranged in alignment with respect to the cavity formed therein. Also, the arc-block 22 carries a collimating electrode 27 disposed adjacent the upper end thereof and having an elongated collimating slot 28 formed therethrough and arranged in alignment with respect to the filamentary cathode 25 as well as the anode 26 and the cavity formed in the arc-block 22. Both the anode 26 and the collimating electrode 27 are electrically connected to the source unit 20, which in turn is grounded; likewise, the tank 13 is grounded. Also, the filamentary cathode 25 and the cooperating anode 26 are adapted to be connected to a suitable source of arc supply.

Further, the removable end wall 18 carries ion accelerating structure 29 formed of carbon or graphite and disposed in spaced-apart relation with respect to the wall of the arc-block 22 in which the slot 24 is formed. More specifically, a slit 30 is formed in the ion accelerating structure 29 and arranged in substantial alignment with respect to the slot 24 formed in the wall of the arc-block 22. A suitable source of accelerating electrode supply is adapted to be connected between the arc-block 22 and the ion accelerating structure 29, the positive and negative terminals of the supply mentioned being respectively connected to the arc-block 22 and to the ion accelerating structure 29. Further, the positive terminal of the accelerating electrode supply is grounded.

The removable end wall 19 suitably supports a collector block 31 formed of stainless steel or the like and provided with two laterally spaced-apart cavities or pockets 32 and 33 which respectively communicate with aligned slots 34 and 35 formed in the wall of the collector block 31 disposed remote from the removable end wall 19. It is noted that the pockets 32 and 33 are adapted to receive two constitutent isotopes of uranium which have been separated in the calutron 10, as explained more fully hereinafter. Further, the inner wall 16 suitably supports a tubular liner 36 formed of copper or the like, rectangular in vertical cross-section, disposed within the tank 13 and spaced from the walls 14, 15, 16 and 17. One end of the tubular liner 36 terminates adjacent the accelerating structure 29; and the other end of the tubular liner 36 terminates adjacent the collector block 31; the tubular liner 36 constituting an electrostatic shield for the high velocity ions traversing the curved paths between the slit 30 formed in the ion accelerating structure 29 and the slots 34 and 35 formed in the collector block 31, as explained more fully hereinafter. Finally, the tubular liner 36 is electrically connected to the ion accelerating structure 29 and to the collector block 31. Thus, it will be understood that the source unit 20 and the tank 13 are connected to the positive grounded terminal of the accelerating electrode supply; while the ion accelerating structure 29, the tubular liner 36 and the collector block 31 are connected to the negative ungrounded terminal of the accelerating electrode supply; the ion accelerating structure 29, the tubular liner 36 and the collector block 31 being electrically insulated from the component parts of the tank 13.

Considering now the general principle of operation of the calutron 10, a charge comprising a compound of the element to be treated is placed in the charge receptacle 21, the compound of the element mentioned being in this case uranium hexachloride. The end walls 18 and 19 are securely attached to the open ends of the tank 13, whereby the tank 13 is hermetically sealed. The various electrical connections are completed and operation of the vacuum pumping apparatus 13a associated with the tank 13 is initiated. When a pressure of the order of $10^{-5}$ to $10^{-4}$ mm. Hg is established within the tank 13, the electric circuits for the windings, not shown, associated with the pole pieces 11 and 12 are closed and adjusted, whereby a predetermined magnetic field is established therebetween traversing the tank 13. The electric circuit for the heater 23 is closed, whereby the charge in the charge receptacle 21 is heated and vaporized. The vapor fills the charge receptacle 21 and is conducted into the communicating cavity formed in the arc-block 22. The electric circuit for the filamentary cathode 25 is closed, whereby the filamentary cathode is heated and rendered electron emissive. Then the electric circuit between the filamentary cathode 25 and the anode 26 is closed, whereby an arc discharge is struck therebetween, electrons proceeding from the filamentary cathode 25 through the collimating slot 28 formed in the collimating electrode 27 to the anode 26. The collimating slot 28 formed in the collimating electrode 27 defines the cross section of the stream of electrons proceeding into the arc-block 22, whereby an arc discharge having a ribbon-like configuration breaks up the molecular form of the vapor of the compound to a considerable extent, producing positive ions of the element that is to be enriched with a selected one of its isotopes.

The electric circuit between the arc-block 22 and the ion accelerating structure 29 is completed, the ion accelerating structure 29 being at a high negative potential with respect to the arc-block 22, whereby the positive ions in the arc-block 22 are attracted by the ion accelerating structure 29 and accelerated through the voltage impressed therebetween. More particularly, the positive ions proceed from the cavity formed in the arc-block 22 through the slot 24 formed in the wall thereof, and across the space between the ion accelerating structure 29 and the adjacent wall of the arc-block 22, and thence through the slit 30 formed in the ion accelerating structure 29 into the interior of the tubular liner 36. The high-velocity positive ions form a vertical upstanding ribbon or beam proceeding from the cavity formed in the arc-block 22 through the slot 24 and the aligned slit 30 into the tubular liner 36.

As previously noted, the collector block 31, as well as the tubular liner 36, is electrically connected to the ion accelerating structure 29, whereby there is an electric-field-free path for the high-velocity positive ions disposed between the ion accelerating structure 29 and the collector block 31 within the tubular liner 36. The high-velocity positive ions entering the adjacent end of the liner 36 are deflected from their normal straight-line path and from a vertical plane passing through the slot 24 and the aligned slit 30, due to the effect of the relatively strong magnetic field maintained through the space within the tank 13 and the liner 36 through which the positive ions travel, whereby the positive ions describe arcs, the radii of which are proportional to the square roots of the masses of the ions and consequently of the isotopes of the element mentioned. Thus according to the present invention in which uranium hexachloride is subjected to treatment in the calutron, ions of a relatively light isotope of uranium describe an interior arc of relatively short radius and are focused through the slot 34 into the pocket 32 formed in the collector block 31; whereas ions of a relatively heavy isotope of uranium described an exterior arc of relatively long radius and are focused through the slot 35 into the pocket 33 formed in the collector block 31. Accordingly, the ions of the relatively light isotope are collected in the pocket 32 and are de-ionized to produce a deposit of that isotope therein; while the ions of the relatively heavy isotope are collected in the pocket 33 and are de-ionized to produce a deposit of that isotope therein.

After all of the uranium hexachloride charge in the charge receptacle 21 has been vaporized, all of the electric circuits are interrupted and the end wall 18 is removed so that another charge may be placed in the charge receptacle 21 and subsequently vaporized in the manner explained above. After a suitable number of charges have been vaporized in order to obtain appropriate deposits of the isotopes of uranium in the pockets 32 and 33 of the collector block 31, the end wall 19 may removed and the deposits of the collected uranium isotopes in the pockets 32 and 33 in the collector block 31 may be reclaimed.

Of course, it will be understood that the various dimensions of the parts of the calutron 10, the various electrical potentials applied between the various electrical parts thereof, as well as the strength of the magnetic field between the pole pieces 11 and 12, are suitably correlated with respect to each other, depending upon the mass numbers of the several isotopes of uranium which is to be treated therein. In this connection reference is again made to the copending application of Ernest O. Lawrence for a complete specification of a calutron especially designed for the production of uranium enriched with an isotope thereof, and including further details of the construction and operation of such devices.

Referring now more particularly to Figs. 3 to 6, inclusive, of the drawings, there are illustrated the structural details of one form of a source unit 20 that may be employed in conjunction with the calutrons when employing uranium hexachloride as charge material in accordance with the present invention. The source unit is arranged in the magnetic field between the pole pieces of the calutron in the manner previously explained, the source unit 20 comprising the charge receptacle 21 and the arc-block 22. The charge receptacle 21 comprises wall structure, including a removable cover 50 defining an upstanding cylindrical cavity or reservoir 51 therein that is adapted to receive a removable cylindrical charge bottle 52, formed of glass or other frangible material and containing a charge 53 of uranium hexachloride that is to be vaporized. The arc-block 22 comprises wall structure defining an upstanding distributing chamber 54 and an upstanding arc chamber 55 therein, the cavity 51 communicating with the distributing chamber 54 through a tubular member 56 supported by the wall structure of the charge receptacle 21 and the wall of the arc-block 22. The wall structure of the charge receptacle 21 carries an exteriorly arranged electric heater 23 of any suitable form, whereby the charge receptacle 21, and consequently the charge bottle 52, may be appropriately heated in order to vaporize the charge 53 contained in the charge bottle 52. Similarly, the wall structure of the arc-block 22 carries an exteriorly arranged electric heater 57 of any suitable form, whereby the arc-block 22 and more particularly the distributing chamber 54 therein may be heated in order to prevent condensation of the contained vapor, as explained more fully hereinafter.

More particularly, the wall structure of the arc-block 22 comprises a substantially inverted U-shaped frame member 58, supporting an upstanding baffle plate 59, the frame member 58 and the baffle plate 59 being formed of carbon or graphite. The frame member 58 is secured to the wall structure of the arc-block 22 by an arrangement comprising two upstanding strips 60, and comprises a top wall 61, two upstanding substantially parallel spaced-apart side walls 62 and a front wall 63, the front wall 63 having the centrally disposed longitudinal slot 24 formed therein and communicating with the arc chamber 55. The side edges of the baffle plate 59 are spaced a short distance from the side walls 62 of the frame member 58 in order to provide communication between the distributing chamber 54 and the arc chamber 55, the baffle plate 59 defining the boundary between the chambers mentioned.

The wall structure of the charge receptacle 21 carries a standard 64 which supports cathode structure 65 in co-operating relationship with respect to the arc-block 22. More particularly, the cathode structure 65 comprises two terminals 66 supporting the opposite ends of the substantially U-shaped filamentary cathode 25, the opposite ends of the filamentary cathode 25 being removably clamped in place by the respective terminals 66, and the two terminals being connected to the suitable source of filament supply, as previously noted. The central portion of the filamentary cathode 25 overhangs the central portion of the top wall 61 of the frame member 58, the top wall 61 having a transversely extending slot 67 formed therethrough communicating with the arc chamber 55. The upper end of the transverse slot 67 is provided with a counter recess 68 extending thereabout which receives the collimating electrode 27, the collimating electrode 27 having the transversely extending slot 28 formed therethrough, as previously noted, and communicating with the transverse slot 67 formed in the top wall 61 and consequently with the arc chamber 55. More particularly, the filamentary cathode 25 is spaced a short distance above the collimating electrode 27, the central portion of the filamentary cathode 25 being arranged in alignment with the transverse slot 28 formed in the collimating electrode 27. Further, a laterally extending slot 69 is formed in the front wall 63 of the frame member 58 adjacent the lower end thereof, and supports the anode 26 extending into the arc chamber 55 in alignment with the central portion of the filamentary cathode 25 and the transverse slot 28 formed in the collimating electrode 27.

The negative and positive terminals of the arc supply are respectively connected to the filamentary cathode 25 and to the arc-block 22, the anode 26 and the collimating electrode 27 being connected together by the frame member 58, and consequently by way of the arc-block 22 to the positive terminal of the arc supply mentioned, as previously noted. Finally, a shield 70 is supported by one of the terminals 66 and extends laterally over the upper surface of the central portion of the filamentary cathode 25 in order to prevent migration of the electrons emitted by the filamentary cathode 25 upwardly in the longitudinal direction.

Considering now the detailed operation of the source unit 20, when the electric circuit for the heater 23 is completed, the charge receptacle 21 and consequnetly the charge bottle 52 are heated, whereby the charge 53 of uranium hexachloride is vaporized, filling the cavity 51 in the charge receptacle 21. The uranium hexachloride vapor passes through the tubular member 56 into the distributing chamber 54, whereby this chamber is filled with the vapor. The vapor is thoroughly mixed in the distributing chamber 54 and passes around the side edges of the baffle plate 59 into the arc chamber 55, whereby this chamber is filled with the vapor. More particularly, the arc chamber 55 is thoroughly and uniformly filled with the uranium hexachloride vapor to be ionized, due to the arrangement of the distributing chamber 54 and the baffle plate 59.

When the circuit for the filamentary cathode 25 is completed, the filamentary cathode 25 is heated and rendered electron emissive; and when the arc supply circuit is completed between the filamentary cathode 25 and the arc-block 22, electrons are projected from the central portion of the filamentary cathode 25 toward the collimating electrode 27. More particularly, some of these electrons pass through the transverse slot 28 formed in the collimating electrode 27 into the arc chamber 55 and proceed toward the anode 26. Accordingly, the collimating electrode 27 causes a stream of electrons having a ribbon-like configuration to be projected through the arc chamber 55, whereby the uranium hexachloride vapor in the arc chamber 55 is ionized. The positive ions produced in the arc chamber 55 are drawn through the upstanding slot 24 formed in the front wall 63 of the frame member 58 by the associated ion accelerating structure 29, whereby the beam of positive ions having a substantially ribbon-like configuration is projected into the adjacent end of the associated liner 36 and directed toward the cooperating collector block 31.

Referring now to Figs. 3, 5, and 6 of the drawings, the charge bottle 52 illustrated constitutes a receptacle, and is formed of glass or other frangible material, as previously noted. More specificaly, the charge bottle 52 includes a flat bottom wall 80, an upstanding cylindrical side wall 81, and a substantially semispheroidal top wall 82 terminating in an upwardly projecting hollow nipple 83. Preferably in the charge bottle 52, the wall structure of the nipple 83 is relatively thin with respect to the wall structure of the top wall 82, whereby the nipple 83 constitutes a frangible portion that may be readily broken off in order to provide an opening through the top wall 82 communicating between the interior of the charge bottle 52 and the cavity 51 formed in the charge receptacle 21.

Further, the source unit 20 comprises an arrangement controllable from the exterior of the tank 13 of the calutron 10 for opening the charge bottle 52; this arrangement comprising a clip 84 removably attached to the nipple 83 provided on the charge bottle 52, and a connected flexible pull wire 85. More particularly, the clip 84 comprises a substantially C-shaped body that is adapted to engage the nipple 83 and to be retained in place by a latch 86, one end of the latch 86 being pivotally secured to one end of the C-shaped body and the other end of the latch 86 being adapted to be sprung over the other end of the C-shaped body, as clearly illustrated in Fig. 6. The pull wire 85 extends through an opening 87 formed in the cylindrical side wall of the charge receptacle 21 and into a surrounding fixture 88, carried by the cylindrical side wall mentioned, and terminates in a control rod 89 extending through an opening 90 formed in the end wall 18 of the tank 13 of the calutron 10.

More specifically, the control rod 89 extends from the exterior through the opening 90 formed in the end wall 18 into the interior of the tank 13, and is mounted for longitudinal sliding movement in sealed relation with respect to the end wall 18 by an arrangement including a Wilson seal 91 and a bushing 92, the extreme outer end of the control rod 89 carrying a handle 89a to facilitate manipulation thereof. More particularly, the Wilson seal 91 is of conventional construction and arrangement and includes an annular flange 93 secured to the exterior surface of the end wall 18 in surrounding relation with respect to the opening 90 formed therein; while the bushing 92 includes an annular flange 94 secured to the interior surface of the end wall 18 in surrounding relation with respect to the opening 90 formed therein. Further, the annular flanges 93 and 94, respectively arranged exteriorly and interiorly of the end wall 18, slidably support the control rod 89.

The bushing 92 further includes an inwardly extending tubular projection 95 surrounding the control rod 89, the inner end of the control rod 89 being secured to the outer end of the pull wire 85, as previously noted, within the tubular projection 95. Specifically, the outer end of the pull wire 85 extends into a centrally disposed opening 96 drilled in the inner end of the control rod 89, and is secured in place by an arrangement including a set screw 97 disposed in a threaded opening formed in the inner end of the control rod 89. Further, the longitudinal sliding movement of the control rod 89 through the opening 90 formed in the end wall 18 is limited and guided by an arrangement including a snap-on ring 98, removably secured in an annular groove formed in the control rod 89 adjacent the extreme inner end thereof, the exterior surface of the snap-on ring 98 engaging the interior surface of the tubular projection 95. Finally, the extreme inner end of the tubular projection 95 carries a fixture 99 which supports one end of a flexible tubular casing or shield 100 surrounding the pull wire 85, the other end of the casing 100 being secured to the fixture 88 carried by the cylindrical wall of the charge receptacle 21.

Accordingly, the control rod 89 is mounted for limited longitudinal sliding movement through the opening 90 formed in the end wall 18, and in sealed relation with respect to the end wall 18 by virtue of the arrangement including the Wilson seal 91, whereby the control rod 89 may be moved longitudinally with respect to the end wall 18 from the exterior of the casing 13 of the calutron 10. The inner end of the control rod 89 is rigidly secured to the outer end of the pull wire 85, whereby the pull wire 85 may be moved back and forth within the surrounding flexible casing 100 and irrespective of the alignment of the control rod 89 and the nipple 83 carried by the top wall 82 of the charge bottle 52. Thus, when the control rod 89 is moved outwardly with respect to the end wall 18, the pull wire 85 is moved outwardly, whereby the clip 84 engaging the nipple 83 exerts a force thereon, causing this frangible nipple 83 to be broken off of the top wall 82 of the charge bottle 52, in order to place the charge 53 of uranium hexachloride contained in the charge bottle 52 into communication with the cavity 51.

Considering now the construction and arrangement of the charge bottle 52 with reference to its operation in the source unit 20, it is noted that in the example illustrated, the charge bottle 52 is filled with a charge 53 comprising the compound uranium hexachloride, evacuated, and hermetically sealed, all prior to use. The previously prepared charge bottle 52 containing the charge 53 is then placed in the cylindrical cavity 51 formed in the charge receptacle 21, the clip 84 carried on the inner end of the pull wire 85 is attached to the nipple 83 provided on the top wall 82 of the charge bottle 52, the clip 84 is secured in place by the latch 86, and the cover 50 for the charge receptacle 21 is secured in place. The end wall 18 carrying the source unit 20 is then moved into assembled relation with respect to the associated end of the tank 13 and secured in place. Operation of the pumping apparatus 13a is initiated, and shortly thereafter, when the pressure in the tank 13 is lowered to the order of $10^{-5}$ to $10^{-4}$ mm. Hg the electric circuits for the windings, not shown, associated with the pole pieces 11 and 12 are closed and adjusted in order to establish the predetermined magnetic field therebetween, traversing the tank 13, as previously noted.

At this time, the control rod 89 is moved outwardly with respect to the end wall 18 by manipulation of the handle 89a, whereby the pull wire 85 is moved outwardly within the casing 100, causing the clip 84 to exert a force upon the nipple 83 in order to break the nipple 83 off of the top wall 82 of the charge bottle 52. At this time, the interior of the charge bottle 52 communicates with the cavity 51 and the circuit for the heater 23 is closed, whereby the charge receptacle 21 and consequently the charge bottle 52 is heated, effecting heating of the contained charge 53 of uranium hexachloride. When the charge 53 contained in the charge bottle 52 is thus heated, it is vaporized and conducted through the opening formed in the top wall 82 into the cavity 51, whereby the cavity 51 is filled with the vapor of uranium hexachloride, and this vapor is conducted through the tubular member 56 into the distributing chamber 54, as previously explained. The uranium hexachloride vapor is thereupon ionized, at least in part, and the ions of uranium isotopes are segregated in accordance with their respective masses, resulting in the production of uranium enriched with the respective isotopes, all as previously explained.

The uranium hexachloride employed in conjunction with the invention described herein may be produced in any desired manner. For example, it may be produced in the manner disclosed in Patent No. 2,572,156, issued October 23, 1951 to Francis A. Jenkins. According to the method there disclosed, a suitable charge of uranium pentachloride (which is conjectured to have the structure represented by the molecular formula $UCl_4 \cdot UCl_6$) is placed in a molecular still which may be of conventional structure, and which includes a hot surface for the destructive distillation of the uranium pentachloride and a cold surface for the condensation of the vapor resulting from the heating step. After evacuating the space within the still to a vacuum corresponding to an absolute pressure of the order of from $10^{-6}$ to $10^{-3}$ mm. Hg, the uranium pentachloride is heated to a temperature in the range of approximately 80° to 180° C., while maintaining the temperature of the cold surface of the still at approximately 10° C. or below, such as by cooling with liquid air. When the uranium pentachloride is heated under subatmospheric pressure in the manner stated, it is converted into $UCl_4$ and $UCl_6$, the $UCl_6$ being sublimed substantially as it is produced, while the $UCl_4$ remains as a residue upon the hot surface of the still. The sublimed $UCl_6$ traverses the space between the hot surface and the cold surface of the still and is condensed on the cold surface in the form of iridescent, dark green, fine-grained crystals possessing a high degree of purity.

While it is preferred to employ substantially pure uranium hexachloride (whether prepared in the above-mentioned manner, or in any other suitable manner) as a calutron source material, it is nevertheless within the scope of the invention to employ uranium hexachloride containing a substantial proportion of impurities, such as other uranium chlorides.

The use of uranium hexachloride as charge material in a calutron is advantageous, among other reasons, in that it permits the vaporization step during the operation of the calutron to take place at materially reduced temperatures, for example, in the range of 60° to 100° C. Vaporization begins at a practicable rate when the space within the calutron charge receptacle 21 is maintained at a temperature in the range of 60° to 80° C., although it is sometimes preferred to operate the heater for the charge receptacle in such manner as to maintain temperatures therein in the range of about 85° to 90° C. It may be pointed out that the use of uranium hexachloride as the charge material also results in substantially reduced corrosion in the vaporizer portion of the calutron source unit, due to the substantially lower temperatures of operation permitted thereby. Operation at the relatively low temperatures mentioned also minimizes or prevents shifting of parts and warping of alignments in the vaporizer section of the source unit in the calutron.

Another definite advantage of employing uranium hexachloride as source material in a calutron, compared with the use of uranium tetrachloride as source material, is that its relatively higher chlorine content tends to increase the concentration of free chlorine present in the source unit during operation of the calutron. This higher concentration of free chlorine more readily attacks substances such as metallic uranium, uranium trichloride, uranium tetrachloride, and possibly uranium dichloride, which substances might otherwise tend to deposit upon various elements within the calutron, including apertures such as slot 24, and which, if permitted to form appreciable deposits in various parts of the calutron, would tend in the course of a relatively short time to seriously interfere with efficient operation of the calutron.

A further important advantage of the use of uranium hexachloride as charge material in the calutron is that it readily permits the use of glass charge bottles, such as those constructed of thermally—and corrosion—resistant glass known as "Pyrex," which can be very conveniently charged and sealed for use in advance of actual calutron operating requirements.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of separating isotopes of uranium comprising heating uranium hexachloride to a temperature in the range of 60° C. to 100° C. in a vacuum and thereby forming a vapor thereof, ionizing uranium hexachloride vapor, whereby ions of the isotopes of uranium are produced, and then segregating the ions of the isotopes of uranium in accordance with their masses.

2. In a calutron comprising an ion source unit including a charge chamber communicating with a vapor ionizing device; the method comprising heating said ion source and charge chamber containing a charge of solid uranium hexachloride to a temperature in the range of 60° C. to 100° C. whereby the charge is vaporized and passes into the vapor ionizing device, and ionizing uranium hexachloride vapor in the vapor ionizing device.

3. In a calutron having an internal pressure of the order of $10^{-5}$ millimeters of mercury and comprising an ion source unit including a vapor ionizing device; the method comprising supplying uranium hexachloride vapor at a temperature in the range of 60 to 100 degrees centigrade to the vapor ionizing device to be ionized.

4. In a calutron comprising a vacuum envelope having an internal pressure of the order of $10^{-5}$ millimeters of mercury and surrounding an ion source unit including a charge reservoir and a vapor ionizing device; the method comprising inserting a charge of solid uranium hexachloride in the charge reservoir, vaporizing said charge by heating to substantially 85 to 90 degrees centigrade, and supplying the vapor thus produced to the vapor ionizing device to be ionized.

5. An improved method of separating isotopes of uranium in a calutron having a tank evacuated to approximately $10^{-5}$ millimeters of mercury pressure and enclosing an ion source including a charge chamber and communicating arc chamber; said method comprising the steps of inserting a charge of solid uranium hexachloride into said charge chamber, heating said charge chamber to a temperature in the range of 60 to 100 degrees centigrade whereby said charge is vaporized and flows into said communicating arc chamber, establishing a high intensity electron discharge in said arc chamber into which said vapor flows and is ionized to produce an arc, and establishing an electric field of proper polarity to attract positively charged ions from said arc chamber whereby ions of said charge are removed from said arc chamber for separation.

References Cited in the file of this patent

UNITED STATES PATENTS

| | | |
|---|---|---|
| 2,221,467 | Bleakney | Nov. 12, 1940 |
| 2,572,156 | Jenkins | Oct. 23, 1951 |
| 2,574,842 | Prescott | Nov. 13, 1951 |
| 2,758,006 | Carter et al. | Aug. 7, 1956 |

OTHER REFERENCES

Nature, August 3, 1935, page 180.

Physical Review, January 15, 1939, page 150.